(12) United States Patent
Lee et al.

(10) Patent No.: US 6,794,814 B2
(45) Date of Patent: Sep. 21, 2004

(54) FIELD EMISSION DISPLAY DEVICE HAVING CARBON NANOTUBE EMITTER

(75) Inventors: Chan Jae Lee, Seoul (KR); Jong Hun You, Kyungki-do (KR)

(73) Assignee: Samsung SDI Co., Ltd., Suwon (KR)

( * ) Notice: Subject to any disclaimer, the term of this patent is extended or adjusted under 35 U.S.C. 154(b) by 150 days.

(21) Appl. No.: 09/978,271

(22) Filed: Oct. 17, 2001

(65) Prior Publication Data
US 2002/0113544 A1 Aug. 22, 2002

(30) Foreign Application Priority Data
Feb. 16, 2001 (KR) .......................................... 2001-7710

(51) Int. Cl.[7] .............................. H01J 1/62; H01J 63/04
(52) U.S. Cl. ...................... 313/496; 313/495; 313/310
(58) Field of Search ................................. 313/495, 496, 313/497, 583, 584, 346 R, 310

(56) References Cited

U.S. PATENT DOCUMENTS

| | | | | |
|---|---|---|---|---|
| 5,965,971 A | * | 10/1999 | Karpov | ....................... 313/309 |
| 6,116,975 A | * | 9/2000 | Saito et al. | ..................... 445/24 |
| 6,307,323 B1 | * | 10/2001 | Song et al. | .............. 315/169.1 |
| 6,359,383 B1 | * | 3/2002 | Chuang et al. | ............. 313/496 |
| 6,445,122 B1 | * | 9/2002 | Chuang et al. | ............. 313/495 |
| 6,468,584 B1 | * | 10/2002 | Yamaura et al. | ............ 427/120 |
| 6,486,599 B2 | * | 11/2002 | Wang et al. | ................ 313/495 |

* cited by examiner

Primary Examiner—Nimeshkumar D. Patel
Assistant Examiner—Kevin Quarterman
(74) Attorney, Agent, or Firm—McGuireWoods LLP

(57) ABSTRACT

The present invention provides a field emission display device capable of operating under a low driving voltage and having an advantage in achieving a large-size display. The field emission display device includes a substrate, an anode electrode formed on the substrate to have a structure of plural line patterns, an insulation layer disposed on the substrate covering the anode electrode except a pixel area formed on the anode electrode, a phosphor layer disposed on the pixel area in contact with the anode electrode, a cathode electrode formed on the insulation layer and having a structure of plural line patterns to intersect with the anode electrode at a right angle, and a carbon nanotube emitter covering at least one edge of the cathode electrode for emitting electrons at least one of the phosphor layers.

18 Claims, 6 Drawing Sheets

FIELD EMISSION DISPLAY DEVICE HAVING CARBON NANOTUBE EMITTER

BACKGROUND OF THE INVENTION

1. Field of the Invention

The present invention relates to a field emission display (FED), and more particularly, to a field emission display having a field emission source formed of carbon nanotube.

2. Description of the Related Art

Recently, the use of carbonaceous materials as a field emission source of a field emission display (FED) has been actively developed. In particular, among the carbonaceous materials, carbon nanotube has been expected as an ideal field emission source because it has an extremely fine edge having a radius of about 100 Å, enabling the emission of electrons even under a voltage of 10~50V.

In general, a diode FED employing carbon nanotube as the field emission source (hereinafter, referred to as "carbon nanotube emitter") includes cathode electrode and anode electrode respectively disposed on a pair of substrate, and carbon nanotube emitter and phosphor layer respectively disposed on the cathode electrode and the anode electrode.

The diode FED as described above has, however, disadvantages because it is difficult to apply high voltage needed to accelerate electrons to the anode electrode, so the brightness of a screen is not sufficient. Also, it is difficult to precisely control an emission current of the carbon nanotube emitter, so it is hard to display multi-gradation images.

A conventional triode FED further includes gate electrode to control the field emission of the carbon nanotube emitter. The triode FED has, however, disadvantages because the cathode and gate electrodes are easily short-circuited via the carbon nanotube emitter when depositing the carbon nanotube materials on the cathode electrode.

Further, the above-mentioned diode and triode FEDs have a problem, because the electrons emitted from the carbon nanotube emitter diverge and activate other phosphor pixels as well as corresponding phosphor pixel.

SUMMARY OF THE INVENTION

It is an objective of the present invention to provide a field emission display device capable of operating under a low driving voltage and converging electrons toward corresponding phosphor pixel.

It is another objective of the present invention to provide a field emission display device that has an advantage in realizing a large-sized display and simplifying the manufacturing procedure thereof.

To achieve the above objectives, the present invention provides a field emission display device including a substrate, an anode electrode formed on the substrate, an insulation layer disposed on the substrate covering the anode electrode except a pixel area to be formed on the anode electrode, a phosphor layer disposed on the pixel area to be in contact with the anode electrode, a cathode electrode formed on the insulation layer between the phosphor layers, and a carbon nanotube emitter disposed on the cathode electrode for emitting electrons toward at least one of the phosphor layers.

Preferably, the anode electrode and the cathode electrode have a structure of plural line patterns and intersect each other at right angles.

Preferably, the carbon nanotube emitter corresponding each phosphor layer is arranged at the same intervals as the phosphor layers covering at least one edge of the cathode electrode.

Alternatively, the carbon nanotube emitter is disposed in a line pattern covering at least one edge of the cathode electrode.

Further, the present invention provides a field emission display device including a substrate, an anode electrode formed on the substrate, an insulation layer disposed on the anode electrode except a pixel area to be formed on the anode electrode, a gate electrode disposed within the insulation layer except the pixel area, a phosphor layer disposed on the pixel area to be in contact with the anode electrode, a cathode electrodes formed on the insulation layer between the phosphor layers, and a carbon nanotube emitter disposed on the cathode covering at least one edge of the cathode electrode for emitting electrons.

Preferably, the field emission display device of the present invention further includes a front substrate which is coupled with the substrate by a sealant. The space formed between the two substrates is kept as vacuum. Further, the front substrate has a transparent electrode to reduce the divergence of the electrons emitted from the carbon nanotube emitter.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will be described in detail with reference to the accompanying drawings.

Figure 1:
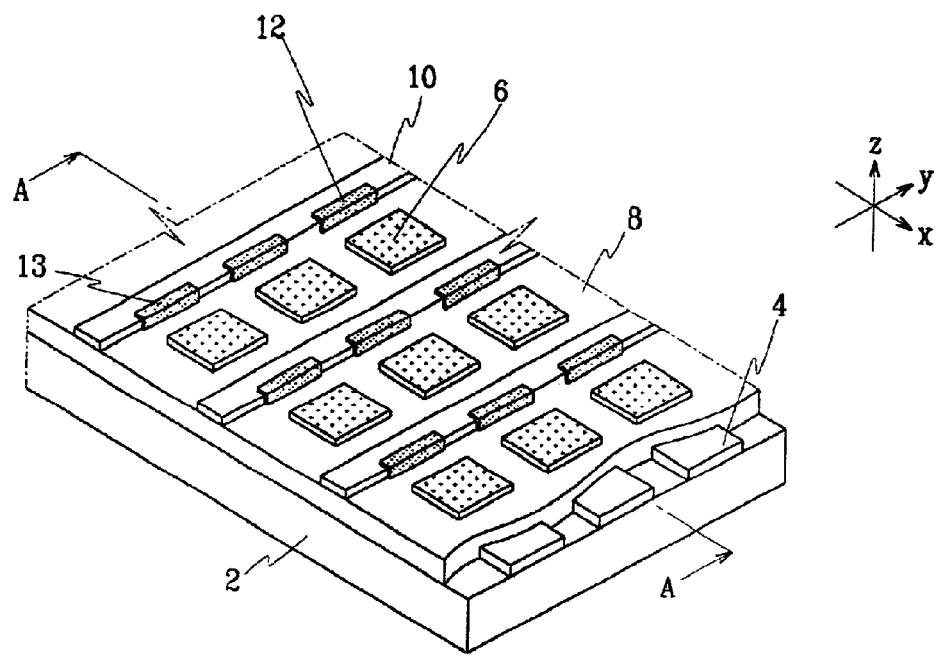
FIG. 1 is a perspective view of a field emission display according to a first embodiment of the present invention.
Figure 2:
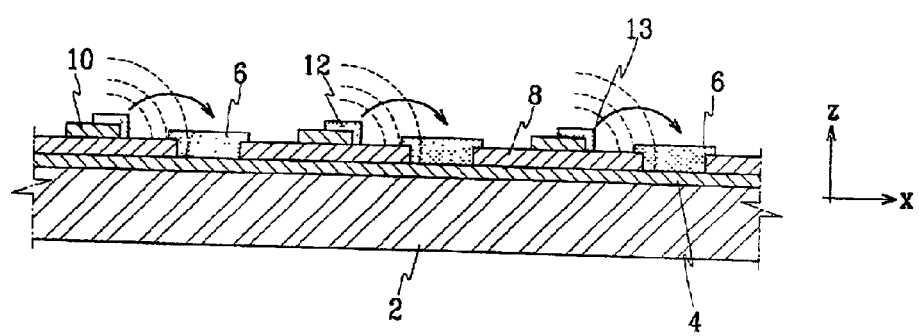
FIG. 2 is a sectional view taken along line I—I of FIG. 1.

FIG. 1 is a perspective view of a field emission display (FED) according to a first embodiment of the present invention, and FIG. 2 is a sectional view taken along line I—I of FIG. 1.

As shown in FIGS. 1 and 2, the FED includes a substrate 2, an anode electrode 4 formed on the substrate 2, an insulation layer 8 disposed on the substrate 2 covering the anode electrode 4 except the pixel area to be formed on the anode electrode 4, a phosphor layer 6 disposed on the pixel area to be in contact with the anode electrode 4, a cathode electrode 10 formed on the insulation layer 8 between the phosphor layers 6, and a carbon nanotube emitter 12 disposed on the cathode electrode 10 covering the right edge of cathode electrode 10 for emitting electrons toward the phosphor layer 6 laid on the right.

The anode electrode 4 is structured to have a plurality of line patterns in a x-direction of the drawing. The phosphor layer 6 consists of red R, green G and blue B phosphor layers, and the shape of each phosphor layer is not limited to the square shape as shown in FIG. 1.

The cathode electrode 10 is insulated from the anode electrode 4 by the insulation layer 8, and structured to have a plurality of line patterns in a y-direction of the drawing to intersect with the anode electrode 4 at right angles. The carbon nanotube emitter 12 corresponding to each phosphor layer 6 is arranged at the same intervals as the phosphor layer 6 covering the right edge of the cathode electrode 10.

For example, the anode electrode 4 is formed by thin-filming process (sputtering or chemical vacuum deposition, etc.), preferably having a thickness of about 3000 Å. A width and an interval of each anode electrode 4 is about 200 $\mu$m and 120 $\mu$m, respectively. The insulation layer 8 is formed of glass paste, preferably to a thickness of about 10~40 $\mu$m. Each phosphor layer 6 may have a size of 200×200 $\mu$m. The cathode electrode 10 is formed by a screen-printing method, preferably to a thickness of about 10~20 $\mu$m. Alternatively, it can be formed by thin-filming process, preferably to a thickness of about 3000 Å. A width of the cathode electrode 10 is about 150 $\mu$m, and a width of the carbon nanotube emitter 12 is about 50 $\mu$m.

In particular, the carbon nanotube emitter 12 has edge 13 facing the corresponding phosphor layer 6, wherein the local electric field around the carbon nanotube emitter 12 is concentrated at the edge 13 when driving voltage is applied to the anode electrode 4 and the cathode electrode 10, respectively.

In the above structure, for example, when scan voltage of −80 V and data voltage of +80 V are applied to the cathode electrode 10 and the anode electrode 4, respectively, electric field is generated around the carbon nanotube emitter 12 that is located at the intersection of the cathode and anode electrodes 10 and 4. The carbon nanotube emitter 12 emits electrons at its edge 13 when sufficient electric field is formed. The electrons pass in a horizontal direction toward the corresponding phosphor layer 6, thereby exciting the phosphor layer 6 and turning the pixel on.

Further, when 0V is applied to at least one of the cathode electrode 10 and the anode electrode 4, the carbon nanotube emitter 12 that is located at the intersection of the cathode and anode electrodes 10 and 4 does not emit electrons, thereby turning the pixel off.

As mentioned above, the present embodiment provides all the components required for driving pixels, that is, the anode electrode 4, the cathode electrode 10, the carbon nanotube emitter 12 and the phosphor layer 6 on the same substrate, thereby simplifying the manufacturing procedure of the FED.

Moreover, this embodiment can reduce the driving voltage due to an approximation between the anode electrode 4 and the cathode electrode 10, and the edge 13 of the carbon nanotube emitter 12. The approximation between the carbon nanotube emitter 12 and the phosphor layer 6 produce so-called "approximaty focusing", thereby improving the focus of the electrons by decreasing the divergence of the electrons.

Figure 3:
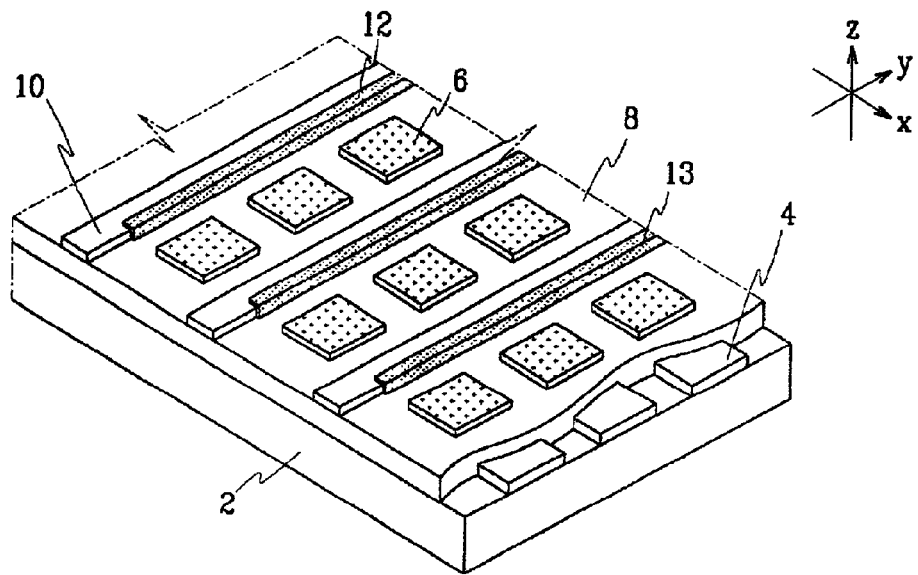
FIG. 3 is a perspective view of a field emission display according to a second embodiment of the present invention.

FIG. 3 is a perspective view of a FED according to a second embodiment of the present invention. In this embodiment, the carbon nanotube emitter 12 is laid on the right edge of the cathode electrode 10 in a line pattern along the y-direction of the drawing. The edge of the carbon nanotube emitter 12 faces the phosphor layer 6 that is positioned in parallel with the cathode electrode 10.

Figure 4:
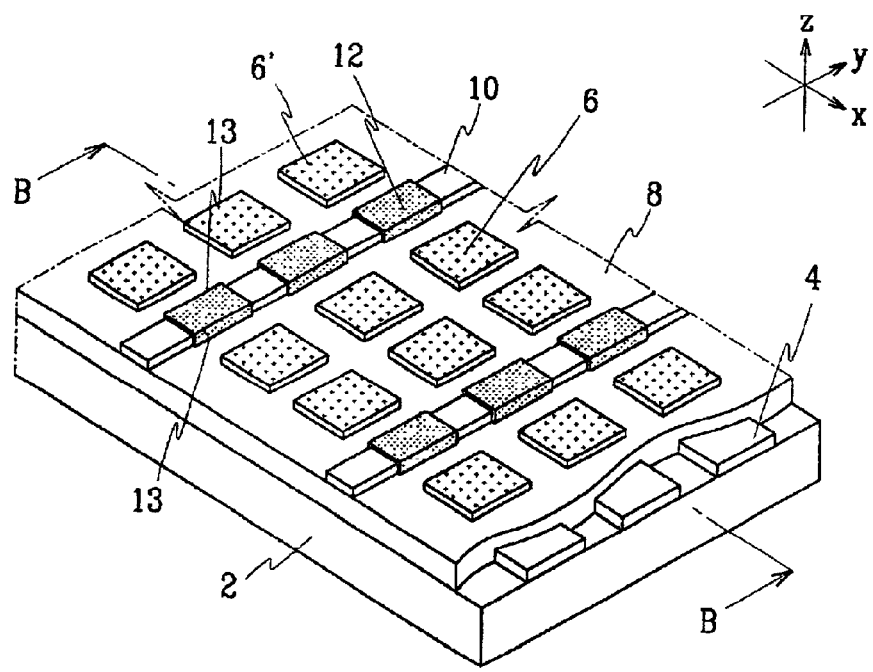
FIG. 4 is a perspective view of a field emission display according to a third embodiment of the present invention.
Figure 5:
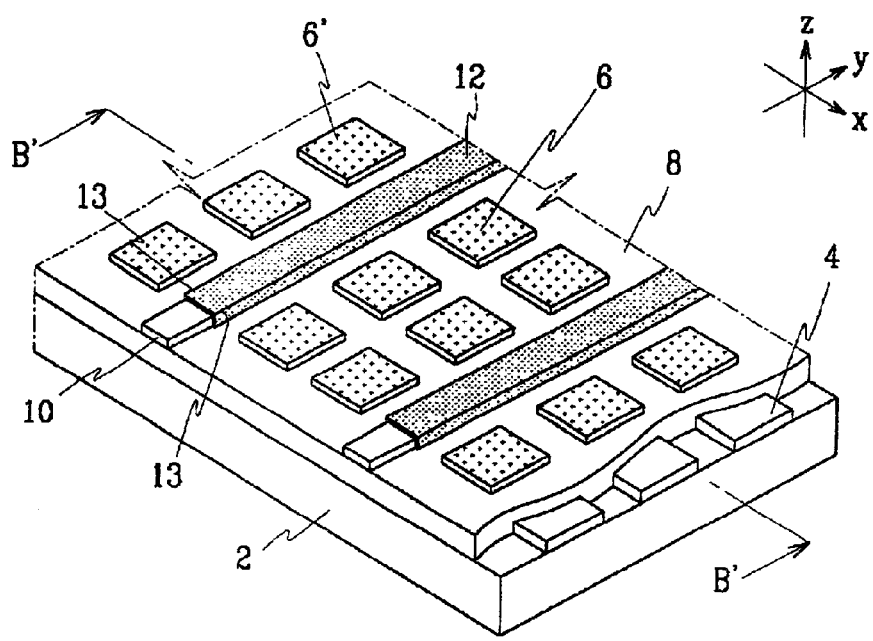
FIG. 5 is a perspective view of a field emission display according to a fourth embodiment of the present invention.

FIGS. 4 and 5 are perspective views of each FED according to a third and a fourth embodiment of the present invention. The carbon nanotube emitter 12 covers both ends of cathode electrode 10. A pair of phosphor layers 6 and 6' at both sides of the cathode electrode 10 correspond to the carbon nanotube emitter 12.

In the third embodiment, the carbon nanotube emitter 12 is formed on the cathode electrode 10 with an interval therebetween corresponding to the phosphor layers 6 as shown in FIG. 4. In the fourth embodiment, the carbon nanotube emitter 12 is arranged in a line pattern along the line pattern of the cathode electrode 10 as shown in FIG. 5.

Figure 6:
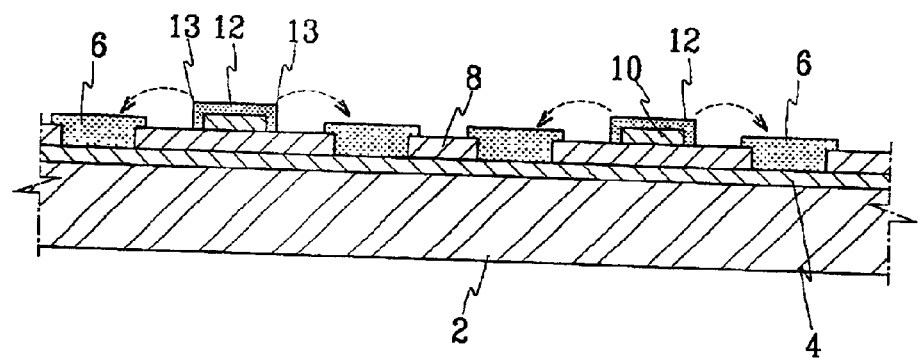
FIG. 6 is a sectional view taken along line II—II of FIG. 4 and line II'—II' of FIG. 5.

According to the third and fourth embodiments, electrons from each edges 13 of the carbon nanotube emitter 12 respectively activates each phosphor layer 6 and 6' that is positioned at left and right sides of the cathode electrodes 10 as shown in FIG. 6.

In the above structure, for example, when scan voltage of −80 V and data voltage of +80 V are applied to the cathode and anode electrodes 10 and 4, respectively, the carbon nanotube emitter 12 that is located at the intersection of the cathode and anode electrodes 10 and 4, emit electrons from their two edges 13 toward the corresponding phosphor layers 6 and 6' thereby exciting the pair of phosphor layers 6 and 6' at the same time.

Figure 7:
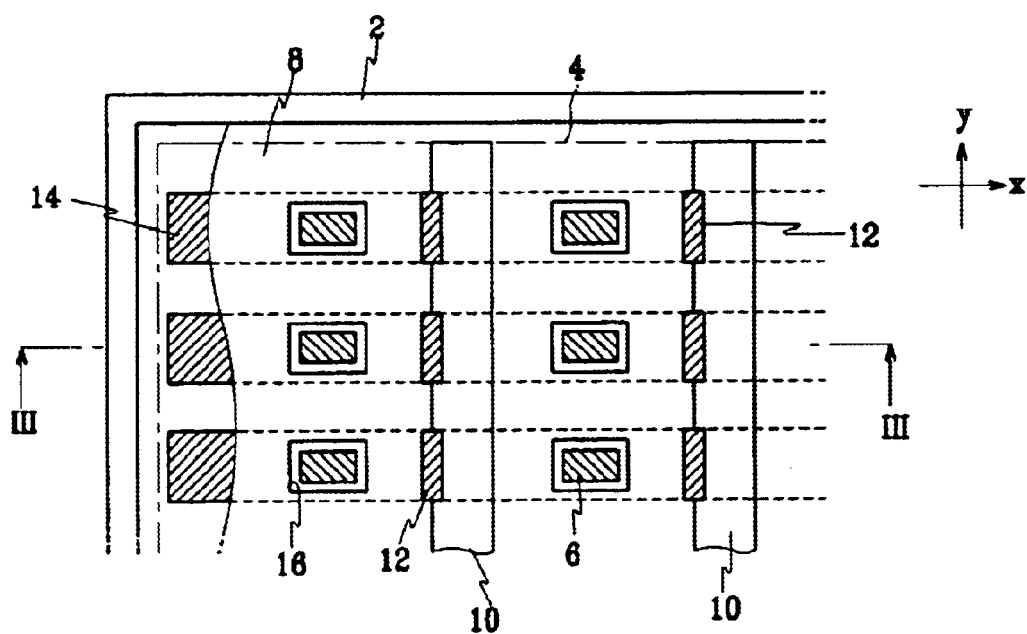
FIG. 7 is a plane view of a field emission display according to a fifth embodiment of the present invention.
Figure 8:
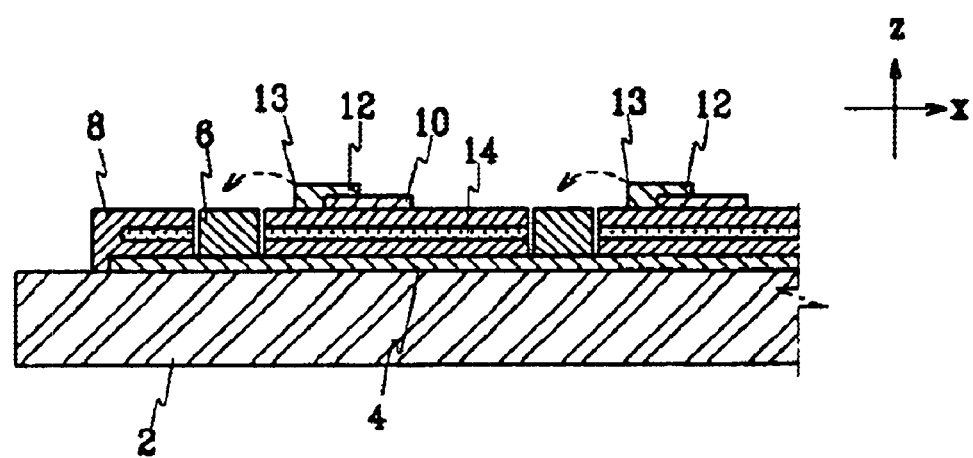
FIG. 8 is a sectional view taken along line III—III of FIG. 7.

FIG. 7 is a plane view of a FED according to a fifth embodiment of the present invention, and FIG. 8 is a sectional view taken along line III—III of FIG. 7. In this embodiment, the FED further includes gate electrode 14 between the anode electrode 4 and the cathode electrode 10.

The anode electrode 4 is disposed on the whole surface of the substrate 2, and the insulation layer 8 with a predetermined thickness covers the anode electrode 4. A plurality of gate electrodes 14 is arranged in a line pattern along the x-direction of the drawing within the insulation layer 8, and a plurality of cathode electrodes 10 is arranged in a line pattern along the y-direction of the drawing on the insulation layer 8. Thus, the gate electrode 14 and the cathode electrode 10 intersect at a right angle while being insulated by the insulation layer 8.

Further, a plurality of holes 16 perforating the insulation layer 8 and the gate electrode 13 is provided at predetermined intervals, and the phosphor layers 6 are disposed inside the holes 16 on the surface of the anode electrode 4.

The carbon nanotube emitter 12 is disposed covering at least one edge of the cathode electrode 10 at predetermined intervals, and their own edges 13 face the corresponding phosphor layer 6. Otherwise, the carbon nanotube emitter 12 may be formed in a line pattern covering at least one edge of the cathode electrode 10.

In the above structure, for example, when scan voltage of −80 V and data voltage of +80 V are applied to the cathode electrode 10 and the gate electrode 14, respectively, the carbon nanotube emitter 12 that is located at the intersection of the cathode and gate electrodes 10 and 14 emit electrons toward the corresponding phosphor layer 6. At this time, an anode voltage of 1~5 kV is applied to the anode electrode 4, thereby accelerating the electrons toward the phosphor layer 6 and reducing the divergence of the electrons. Besides, when 0V is applied to at least one of the cathode electrode 10 and the gate electrode 14, the pixels that are located at the intersection of the two electrodes are turned off.

Figure 9:
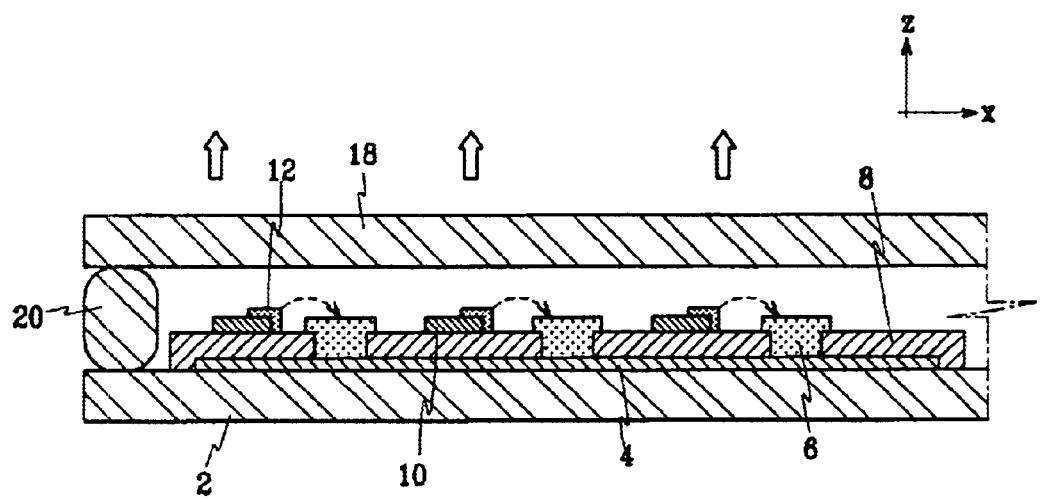
FIG. 9 is a sectional view of a field emission display having a front substrate according to the present invention.
Figure 10:
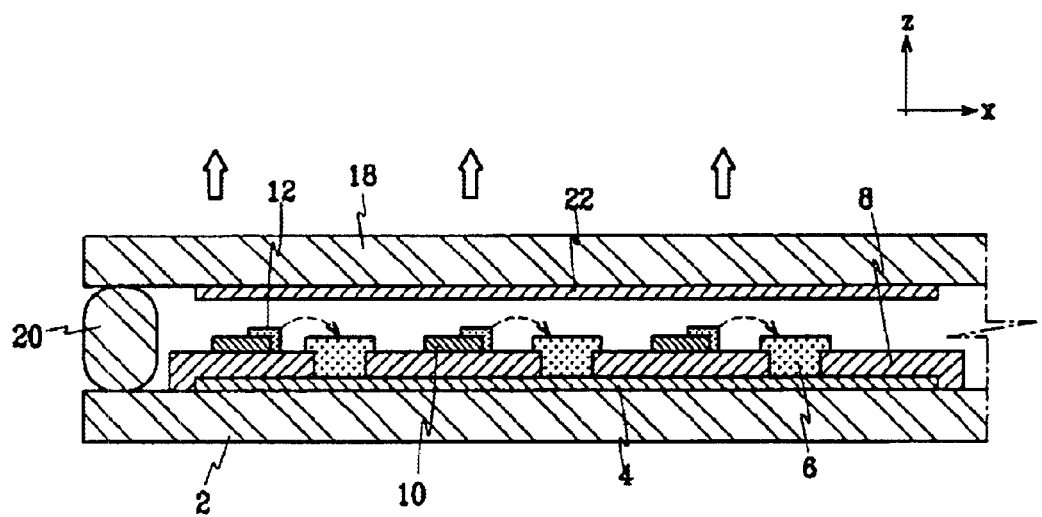
FIG. 10 is a sectional view of a field emission display according to another embodiment of FIG. 9.

While, the FEDs according to the embodiments of the present invention include a transparent front substrate 18 sealed with the substrate 2 at a peripheral portion by a sealant 20 as shown in FIG. 9. A space between the substrate 2 and the front substrate 18 is kept as vacuum. Preferably, the front substrate 18 has a transparent electrode 22 on the inner surface thereof as shown in FIG. 10.

For example, when a suitable voltage between −80~0V is applied to the transparent electrode 22, the minus potential of the transparent electrode 22 controls the path of the electrons emitted from the carbon nanotube emitter 12 so as to pass the electrons toward the corresponding phosphor layer 6, without diverging toward the front substrate 18.

As the space between the substrate 2 and the front substrate 18 has no influence on the operation, spacers (not shown) between the two substrates 2 and 18 are not essential in the present invention. In cases, only a limited number of spacers are required to endure the atmospheric pressure.

What is claimed is:

1. A field emission display device, comprising:
   a substrate;
   an anode electrode formed on the substrate;
   an insulation layer disposed on the substrate covering the anode electrodes except a pixel area formed on the anode electrode;
   a phosphor layer disposed on the pixel area in contact with the anode electrode;
   a cathode electrode formed on the insulation layer between the phosphor layers; and
   a carbon nanotube emitter disposed on a portion of two surfaces of the cathode electrode, the carbon nanotube emitter emitting electrons toward the phosphor layers.

2. The field emission display device of claim 1, wherein the carbon nanotube emitter is disposed on at least one edge of the cathode electrode.

3. The field emission display device of claim 1, wherein the anode electrode and the cathode electrode have a structure of line patterns and the anode electrode and the cathode electrode intersect each other at a right angle.

4. The field emission display device of claim 3, wherein the carbon nanotube emitter corresponding to the phosphor layer is arranged at a same intervals as the phosphor layers and the carbon nanotube emitter covers an edge of the cathode electrode.

5. The field emission display device of claim 3, wherein the carbon nanotube emitter is disposed in a line pattern covering an edge of the cathode electrode.

6. The field emission display device of claim 3, wherein the carbon nanotube emitter corresponding to the phosphor layer is arranged at a same intervals as the phosphor layers and the carbon nanotube emitter covers two edges of the cathode electrode.

7. The field emission display device of claim 3, wherein the carbon nanotube emitter is disposed in a line pattern covering both edges of the cathode electrode.

8. The field emission display device of claim 1, further comprising a gate electrode disposed within the insulation layer, the one gate electrode being arranged between the anode electrode and the cathode electrode.

9. The field emission display device of claim 1, further comprising a transparent front substrate coupled with the substrate by a sealant while a space between the substrate and the front substrate is kept as vacuum.

10. The field emission display device of claim 9, wherein the transparent front substrate has a transparent electrode on a surface thereof facing the substrate.

11. The field emission display device of claim 1, wherein a portion of the carbon nanotube emitter exists on a same plane as the phosphor layer corresponding to the carbon nanotube emitter.

12. A field emission display device, comprising:
    a substrate;
    an anode electrode formed on the substrate to have a structure of a line patterns;
    an insulation layer disposed on the substrate covering the anode electrode except a pixel area formed on the anode electrode;
    a phosphor layer disposed on the pixel area in contact with the anode electrode;
    a cathode electrode formed on the insulation layer and having a structure of a line patterns, the cathode electrode intersecting the anode electrode at a right angle; and
    a carbon nanotube emitter continuosly covering a portion of two surfaces of the cathode electrode for emitting electrons toward the phosphor layers.

13. The field emission display device of claim 12, wherein a portion of the carbon nanotube emitter exists on a same plane as the phosphor layer corresponding to the carbon nanotube emitter.

14. A field emission display device, comprising:
    a substrate;
    an anode electrode formed on the substrate;
    an insulation layer disposed on the anode electrode except a pixel area formed on the anode electrode;
    a gate electrode disposed within the insulation layer except the pixel area;
    a phosphor layer disposed on the pixel area in contact with the anode electrode;
    a cathode electrodes formed on the insulation layer between the phosphor layers; and
    a carbon nanotube emitter disposed on the cathode electrode, the carbon nanotube emitter covering a portion of two surfaces of the cathode electrode including a portion where the two surfaces of the cathode electrode meet.

15. The field emission display of claim 14, wherein the gate electrode and the cathode electrode have a structure of a line patterns, the gate electrode and the cathode electrode intersecting each other at a right angle.

16. The field emission display device of claim 14, further comprising a transparent front substrate coupled with the substrate by a sealant while a space between the substrate and the front substrate is kept as vacuum.

17. The field emission display device of claim 16, wherein the transparent front substrate has a transparent electrode on a surface facing the substrate.

18. The field emission display device of claim 14, wherein a portion of the carbon nanotube emitter exists on a same plane as the phosphor layer corresponding to the carbon nanotube emitter.

\* \* \* \* \*